United States Patent [19]

Ravani et al.

[11] 4,059,055

[45] Nov. 22, 1977

[54] RAILWAY CAR HINGE-DECK LOCK

[75] Inventors: Chandrakant D. Ravani, Farmington; James C. Robertson, Ypsilanti, both of Mich.

[73] Assignee: Portec, Inc., Oak Brook, Ill.

[21] Appl. No.: 722,821

[22] Filed: Sept. 13, 1976

[51] Int. Cl.² .............................................. B61D 3/02
[52] U.S. Cl. ............................... 105/368 R; 105/370; 105/375; 296/1 A
[58] Field of Search ................... 105/368 R, 370, 372, 105/375, 435; 187/4.47, 4.49, 5; 296/35 A, 1 A; 292/342, 343, 265

[56] References Cited

U.S. PATENT DOCUMENTS

| | | | |
|---|---|---|---|
| 3,426,704 | 2/1969 | Blunden | 105/368 R |
| 3,866,543 | 2/1975 | Richard | 105/370 X |
| 3,927,621 | 12/1975 | Skeltis et al. | 105/368 R |

Primary Examiner—Albert J. Makay
Attorney, Agent, or Firm—Emory L. Groff, Jr.

[57] ABSTRACT

A lock mechanism for a railway car hinge-deck section includes a locking lever pivotally attached to a railway car and having an upper and lower wedge bar alternately engageable with a wedge plate carried by the hinge-deck section when the section is displaced to a raised or lowered position, respectively. Seat means affixed to the car restrict vertical displacement of the deck section and cooperates with mating inclined surfaces on the wedge bars and wedge plate to provide positive, tight retention of the hinge-deck section in either of its locked positions.

10 Claims, 2 Drawing Figures

RAILWAY CAR HINGE-DECK LOCK

This invention relates to a railway car having an improved locking mechanism for fixedly retaining a hingedeck section in one of two alternate positions.

Railway cars for the transportation of automobiles have long been employed as the principal means of transport for this commodity and the very cost factor would, of course, dictate that the maximum number of automobiles must be accommodated on any one rail car. For several years multi-level auto rack railway cars have been utilized. In order to accommodate the maximum number of automobiles on a car without exceeding the maximum allowable vertical height permitted along the track line, it is necessary to locate the deck next above the floor of the car at the lowest permissible height allowing of storage of standard size automobiles therebeneath. If this raised deck were fixed throughout the length of the car it would not be possible to load and unload the automobiles from the end of the car in view of the increased elevation of the car floor in the area of the car couplers. Accordingly, it has been standard practice to provide hinged deck sections at the ends of the elevated deck of a railway car so that these deck sections may be raised during the loading and unloading of automobiles from the lowestmost level or floor of the railway car. The necessity for such a requirement is even more prevalent now that all new automobiles must be equipped with catalytic converters, which mandatory equipment significantly reduces the available clearance between the lowest point under an automobile and the bottom of the vehicle wheels. The use of hinge-deck sections is most apparent in tri-level auto rack railway cars as it permits location of the raised deck at a lower elevation, thus reducing the overall height of a tri-level car and lowering the center of gravity of the car when loaded with automobiles.

Numerous forms of multi-level railway cars have been produced with various means to permit vertical displacement of the end sections of the deck disposed above the floor of the car, yet most of these prior known arrangements have involved expensive and complicated structure to accomplish the desired displacement. One such arrangement involves an intricate cam assembly requiring the use of a separate tool for its manipulation. Another example will be found in U.S. Pat. No. 3,927,621 issued on Dec. 23, 1975 and assigned to the assignee of this invention. The referenced patent discloses a construction including a prestressed lock rod having a notched plate cooperating with a spring-loaded hinge-deck section having a cut-out portion adapted to engage alternate portions of the lock plate to retain the hinge-deck section in a raised or lowered position. The present invention is intended to offer an improvement over the construction of the referenced patent and includes a pair of wedge bars carried by a pivoted locking lever and cooperating with a wedge plate on the hinge-deck section. In this manner a positive forceful camming action is achieved when the hinge-deck section is locked in either its raised or lowered position such that vertical oscillations of the deck during movement of the railway car are discouraged. Additionally, means are now provided to positively limit the upward and downward displacement of the hinge-deck section, which means also serves as seating or registering means during displacement of the hinge-deck section between its alternate positions.

Accordingly, one of the objects of the present invention is to provide an improved multi-level auto rack car having a pivoted locking lever operable to engage with and retain a hinge-deck section in either an elevated or lowered position.

A further object of the present invention is to provide an improved locking mechanism for a hinge-deck section of a railway car including a pivoted locking lever having a pair of wedge bars engageable with a wedge plate on the hinge-deck section to retain the deck section in either an elevated or lowered position.

Another object of the present invention is to provide an improved locking mechanism for a railway car hinge-deck section including a spring normally urging the deck section into a raised position and cooperating with seating means fixed relative the car body and engageable with mating means on the hinge deck section to limit the vertical displacement of the deck section.

With these and other objects in view which will more readily appear as the nature of the invention is better understood, the present invention consists of the construction, combination and arrangement of parts hereinafter more fully described, illustrated and claimed.

A preferred and practical embodiment of the invention is shown in the accompanying drawing in which.

Similar reference characters designate corresponding parts throughout the several figures of the drawing.

Figures 1, 2:
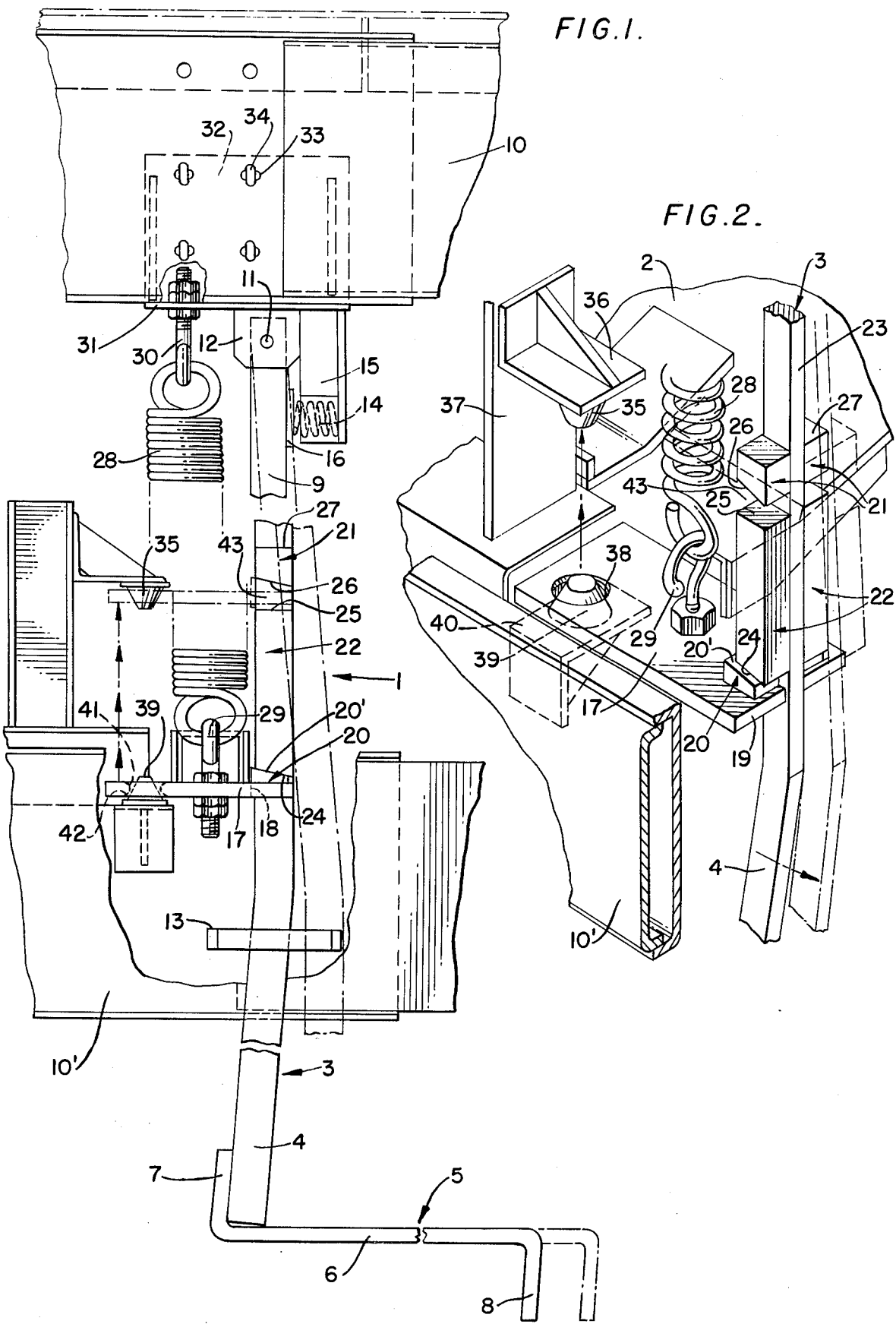
FIG. 1 is a fragmentary side elevation of the hinge-deck lock mechanism of the present invention, illustrating the locking lever and hinge-deck section in their alternate positions.
FIG. 2 is a partial perspective view of the structure of FIG. 1.

Referring now to the drawing, it will be understood that the illustrated railway car hinge-deck lock mechanism may be utilized in association with a multi-level auto rack railway car of any suitable well known construction. Accordingly, it is only necessary to illustrate and describe that much structure of a railway car as is necessary for one to understand the construction and application of the locking mechanism of the present invention. The hinge-deck locking mechanism, generally designated 1, is intended to be installed at the outside corners of each end of a railway car hinge-deck section 2 in substantially the same area as the earlier described lock mechanism set forth in U.S. Pat. No. 3,927,621.

The actuating member of the lock mechanism in the present invention comprises a substantially vertically extending locking lever 3 having a lower portion 4 disposed significantly below the plane of the hinge-deck section 2 and to which is attached the handle 5. This handle 5 comprises a main body 6 which is substantially horizontally disposed and includes an upwardly extending mounting arm 7 suitably secured to the lever lower portion 4 while the opposite end of the main body 6 is provided with a downwardly extending hand grip 8. The upper portion 9 of the lever 3 is disposed substantially above the plane of the hinge-deck section 2 and is affixed relative the railway car side body member 10 by means of the pivot 11 supported by the fixed lever bracket 12. The bracket 12 and the pivot 11 are so located to restrict the displacement of the lever 3 to solely a fore and aft movement relative the length of the railway car as depicted by the illustration of the alternate positions of the lever in FIG. 1 of the drawing.

A suitable guide bar 13 may be affixed to the inner surface of the lower railway car side body member 10' to restrict the lateral displacement of the lower portion 4 of the lever 3 during its actuation. The lever 3 is normally urged to its inward or locking position as reflected by the full lines in FIGS. 1 and 2 of the drawing by means of a compression spring 14 carried by the spring housing 15 fixedly mounted relative the car side body member 10. A spring pressure plate 16 affixed either to the free end of the compression spring 14 or carried by the outer edge of the upper portion 9 of the lever 3 provides an enlarged contact or bearing surface between the spring and lever to ensure maximum effective operation of the spring in urging the lever inwardly toward the center of the railway car.

The hinge-deck section 2 is provided at each of its outer corners with a catch plate 17 having a notch 18 in its outer edge 19 juxtaposed the path of movement of the lever. The notch 18 is dimensioned to allow unencumbered movement of the body of the lever 3 between its alternate positions. Straddling and attached to either side of this notch 18 is a hinge-deck wedge plate 20 having a top inclined surface 20' which will be seen to be inclined downwardly toward the outer edge 19 of the subjacent catch plate 17.

The referenced wedge plates 20—20 will be understood to provide a positive camming lock action to retain the hinge-deck section 2 in both its lowered and raised positions. This action is achieved by means of an upper wedge bar 21 and lower wedge bar 22 fixedly attached to the medial portion 23 of the locking lever 3. The lower wedge bar 22 comprises two sections, one on either side of the lever 3 and each including an inclined bottom surface 24 which will be seen to be inclined downwardly away from the outer edge 19 of the hinge-deck section 2 at an angle which is approximately parallel to the angle of inclination of the top surface 20' of the wedge plate 20. The opposite end of the lower wedge bar 22 comprises a substantially horizontal top surface 25.

The upper wedge bar 21 is generally of similar construction as the lower wedge bar 22 but need not have as great a height as the lower wedge bar 22. In other words, the upper wedge bar 21 is provided with an inclined bottom surface 26 similar to the inclined bottom surface 24 of the lower wedge bar 22 while the top surface 27 of the upper wedge bar 21 may be of any suitable configuration since it does not perform any function in retaining the hinge-deck section 2 in either of its alternate locked positions.

The displacement of the hinge-deck section 2 and its integral catch plate 17 from its lowered or transport position to its raised position is facilitated by means of a tension or lift spring 28 having its lower end secured to the catch plate 17 by means of the bottom anchor member 29 while the upper end of the spring is secured to a fixed top anchor member 30 carried by the bottom wall 31 of a mounting plate 32 permanently affixed to the upper railway car side body member 10. Means are provided in the mounting plate 32 and side body member 10 to facilitate the exact positioning of the mounting plate during the initial assembly of the lock mechanism of the present invention. This comprises the formation of a plurality of horizontal slots 33 in the mounting plate 32 intended to be aligned with a corresponding number of vertical slots 34 provided in the upper railway car side body member 10 such that during the initial assembly suitable fastening means such as bolts and nuts may be inserted through the adjacently aligned slots 33 and 34 to retain the mounting plate 32 juxtaposed the car side body member 10 while allowing of both limited vertical and horizontal adjustment therebetween prior to finally permanently affixing the mounting plate to the car side body member such as by welding.

In operating the present invention, when the handle 5 is grasped and the lever 3 displaced outwardly about the pivot 11 to the dotted line position of FIGS. 1 and 2 of the drawing, it will be seen that the wedge bars 21 and 22 will be transversely displaced outside the vertical plane of the hinge-deck section catch plate outer edge 19 such that the action of the lift spring 28 will cause the hinge-deck section and its integral catch plate 17 to be displaced upwardly. This upward displacement will be limited due to the provision of the upper male seat element 35 comprising a conically tapered member carried by the upper offset seat bracket 36, which bracket may be affixed to any relatively stationary portion of the railway car such as the vertical body member 37. It will be noted that the catch plate is provided with a seat opening 38 adapted to engage the conical periphery of the upper seat element 35. The lowermost limits of displacement of the hinge-deck section 2 and its catch plate 17 are similarly defined by a lower male seat element 39 carried by a lower offset seat bracket 40 suitably affixed to a stationary portion of the railway car such as the lower side body member 10' and it follows that the two seat elements 35 and 39 are vertically aligned so as to ensure concentricity with the single catch plate seat opening 38 when the catch plate is in its two alternate positions. The referenced catch plate seat opening 38 may be provided with an upper chamfer 31 and a lower chamfer 42 adapted to engage respectively the upper male seat element 35 and lower male seat element 39.

With the foregoing structure in mind, the operation of the hinge-deck locking mechanism may now be readily understood. When it is desired to lock the hinge-deck section 2 in its lowermost position it is only necessary for the operator to manually urge the hinge-deck section downwardly against the force of the lift spring 28 until the catch plate seat opening 38 has registered with and fully engaged the conical periphery of the lower male seat element 39, at which time the inclined bottom surface 24 of the lower wedge bar 22 will clear the outer edge 19 of the catch plate 17 and slide above or over the top inclined surface 20' of the wedge plate 20—20. The lever compression spring 14 will be understood to constantly urge the medial and lower portions of the lever 3 inwardly, yet it will be quite apparent that as a final maneuver the operator may apply additional positive inward pressure upon the lower portion of the lever to increase the camming action between the bottom surface 24 of the lower wedge bar 22 and top inclined surface 20' of the wedge plate 20 to ensure the maximum tight engagement between the sliding components of the lock mechanism thereby precluding the possibility of any vertical oscillation of the hinge-deck section during subsequent movement of the railway car. When it is desired to elevate the hinge-deck section to its raised position, the operator merely engages the hand grip 8 of the handle 5 and pulls same outwardly away from the catch plate 17 until the lower wedge bar 22 fully clears the wedge plate 20 and is disposed outside the vertical plane of the catch plate outer edge 19, and while the operator retains the lever 3 in this outward position, against the force of the lever compression spring 14, the lift spring 28, which was in an extended condition when the hinge-deck section was locked in its lowered position, will cause the catch plate 17 and its attached hinge-deck section 2 to be elevated until the upper male seat element 35 has fully registered within the catch plate seat opening 38, at which time the operator releases the handle of the locking lever 3 to allow the lever spring 14 to urge the wedge opening 43 formed between the upper wedge bar 21 and lower wedge bar 22 to surround the catch plate 17 and its wedge plate 20 within the horizontal top surface 25 of the lower wedge bar 22 sliding along the undersurface of the catch plate 17, while the inclined bottom surface 26 of the upper wedge bar 21 slides along the top inclined surface 20' of the wedge plate 20 until a tight camming action is achieved, thus thoroughly locking the hinge-deck section 2 in its elevated position.

We claim:

1. In a multi-level auto rack railway car having a hinge-deck section, the improvement comprising, a deck section lock mechanism including, a locking lever having an upper portion pivotally attached to said car and a lower portion depending to a point below said deck section, a catch plate on said deck section having an outer edge juxtaposed said lever, an upper and lower wedge bar on said lever spaced apart from one another to provide an opening therebetween, a wedge plate on said catch plate adjacent said outer edge, fixed upper and lower seat elements on said car disposed above and below said catch plate defining respectively upper and lower limits of displacement of said deck section whereby, when said deck section is lowered to engage said lower seat element said lever may be pivoted to position said lower wedge bar in overlying relationship with said wedge plate and when said deck section is raised to engage said upper seat element said lever may be pivoted to position said wedge plate within said opening between said upper and lower wedge bars.

2. A deck section lock mechanism according to claim 1 including, spring means between said car and deck section normally urging said deck section upwardly toward engagement with said upper seat element.

3. A deck section lock mechanism according to claim 1 including, spring means between said car and said lever upper portion normally urging said lever toward said catch plate outer edge.

4. A deck section lock mechanism according to claim 1 including, a notch through said catch plate and wedge plate extending through said catch plate outer edge and adapted to freely accept said lever when either said wedge bars are urged into overlying relationship with said wedge plate.

5. A deck section lock mechanism according to claim 1 wherein, both said upper and lower wedge bars include an inclined bottom surface and said wedge plate is provided with a mating inclined top surface.

6. A deck section lock mechanism according to claim 1 wherein, said seat elements comprise vertically aligned and opposed projecting members and said catch plate includes a seat opening registering with either said seat element.

7. A deck section lock mechanism according to claim 1 wherein, said lever is substantially vertically disposed, a handle attached to said lever lower portion and extending substantially normal therefrom and a handgrip on said handle.

8. A deck section lock mechanism according to claim 5 wherein, said lower wedge bar includes a horizontal top surface engageable with the undersurface of said catch plate when said deck section is secured in a raised position.

9. A deck section lock mechanism according to claim 6 wherein, said seat elements comprise frusto-conical members.

10. A deck section lock mechanism according to claim 9 wherein, said catch plate seat opening includes an upper and lower chamfer engageable respectively with said upper and lower seat elements.

* * * * *